(12) United States Patent
Kato et al.

(10) Patent No.: US 12,391,155 B2
(45) Date of Patent: Aug. 19, 2025

(54) SEAT AND CONTROL METHOD

(71) Applicant: TOYOTA BOSHOKU KABUSHIKI KAISHA, Aichi (JP)

(72) Inventors: Yasuhiro Kato, Aichi (JP); Akio Shimizu, Aichi (JP); Takahiro Harita, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 196 days.

(21) Appl. No.: 18/207,428

(22) Filed: Jun. 8, 2023

(65) Prior Publication Data

US 2023/0406168 A1 Dec. 21, 2023

(51) Int. Cl.
*B60N 2/235* (2006.01)
*B60N 2/02* (2006.01)

(52) U.S. Cl.
CPC ......... *B60N 2/2362* (2015.04); *B60N 2/0244* (2013.01)

(58) Field of Classification Search
CPC .............. B60N 2/0244; B60N 2/2362; B60N 2002/0216; B60N 2/1867; B60N 2/2252
USPC ............ 297/344.13, 362, 362.11, 367 P, 325
See application file for complete search history.

(56) References Cited

U.S. PATENT DOCUMENTS

| 7,243,994 B2 * | 7/2007 | Cha ..................... | B60N 2/2252 |
| | | | 475/162 |
| 7,878,594 B2 * | 2/2011 | Fukuzawa ............ | B60N 2/2254 |
| | | | 297/362.12 |
| 2013/0200675 A1 * | 8/2013 | Beneker ............... | B60N 2/0881 |
| | | | 297/344.1 |

FOREIGN PATENT DOCUMENTS

| DE | 19729562 A1 * | 1/1998 | .......... B60N 2/2252 |
| EP | 1055549 A1 * | 11/2000 | .......... B60N 2/1615 |
| JP | 2015-146873 A | 8/2015 | |

* cited by examiner

*Primary Examiner* — Milton Nelson, Jr.
(74) *Attorney, Agent, or Firm* — Greenblum & Bernstein, P.L.C.

(57) ABSTRACT

When reversing a direction in which an angle is adjusted by a first adjustment section and reversing a direction in which a posture is adjusted by a second adjustment section, a control section of a seat provides, before a timing at which a driving direction of a second driving section is reversed, a stop period for stopping the second adjustment section from adjusting the posture, and the control section causes the first adjustment section to carry out a preparation operation in advance during the stop period.

7 Claims, 8 Drawing Sheets

|  | Step 1 | Step 2 | Step 3 | Step 4 | Step 5 | Step 6 |
|---|---|---|---|---|---|---|
| First driving section | Positive rotation | Stop | Negative rotation for predetermined time | Negative rotation | Stop | Positive rotation for predetermined time |
| Second driving section | Positive rotation | Stop | Stop | Negative rotation | Stop | Stop |

SEAT AND CONTROL METHOD

This Nonprovisional application claims priority under 35 U.S.C. § 119 on Patent Application No. 2022-096785 filed in Japan on Jun. 15, 2022, the entire contents of which are hereby incorporated by reference.

TECHNICAL FIELD

The present disclosure relates to a seat and a control method.

BACKGROUND ART

Patent Literature 1 discloses a seat reclining device including: a first gear having external teeth; a second gear having internal teeth; a first wedge member and a second wedge member that cause one of the first gear and the second gear to move with respect to the other; and a cam member that abuts on the first wedge member and causes the first and second wedge members to rotate.

CITATION LIST

Patent Literature

[Patent Literature 1]
Japanese Patent Application Publication Tokukai No. 2015-146873

SUMMARY OF INVENTION

Technical Problem

In the conventional technique as described above, when reversing an adjustment direction of an angle of a seatback with respect to a seat bottom, it is necessary to cause the cam member that has been in contact with the first wedge member to abut on the second wedge member. When the cam member is rotated from a position at which the cam member abuts on the first wedge member to a position at which the cam member abuts on the second wedge member, there is a period in which the cam member is not in contact with any of the first wedge member and the second wedge member. Therefore, when control is carried out to reverse a reclining mechanism and another mechanism, there is a problem that an operation of the reclining mechanism is delayed with respect to an operation of the other mechanism.

An object of an aspect of the present disclosure is to eliminate an operation delay in a reclining mechanism that may occur when adjustment directions of the reclining mechanism and a mechanism other than the reclining mechanism are reversed.

Solution to Problem

A seat in accordance with an aspect of the present disclosure includes: a seat bottom; a seatback; a first adjustment section that includes a first driving section and that adjusts an angle of the seatback with respect to the seat bottom in a direction corresponding to a driving direction of the first driving section; a second adjustment section that includes a second driving section and that adjusts a posture of the seat in a direction corresponding to a driving direction of the second driving section; and a control section that controls the first driving section and the second driving section, a preparation operation being carried out for the first adjustment section during a period from when the driving direction of the first driving section is reversed to when the direction in which the angle is adjusted is reversed, and when reversing the direction in which the angle is adjusted by the first adjustment section and reversing the direction in which the posture is adjusted by the second adjustment section, the control section providing a stop period before a timing at which the driving direction of the second driving section is reversed, the stop period being a period for stopping the second adjustment section from adjusting the posture, and the control section causing the first adjustment section to carry out the preparation operation in advance during the stop period.

The control section of the seat in accordance with each aspect of the present disclosure can be realized by a computer. In such a case, the present disclosure encompasses (i) a control program which causes the computer to serve as the control section (software element) for realizing the control section and (ii) a computer-readable storage medium storing the control program.

Advantageous Effects of Invention

According to an aspect of the present disclosure, it is possible to eliminate an operation delay in a reclining mechanism that may occur when adjustment directions of the reclining mechanism and another mechanism are reversed.

DESCRIPTION OF EMBODIMENTS

Figure 1:
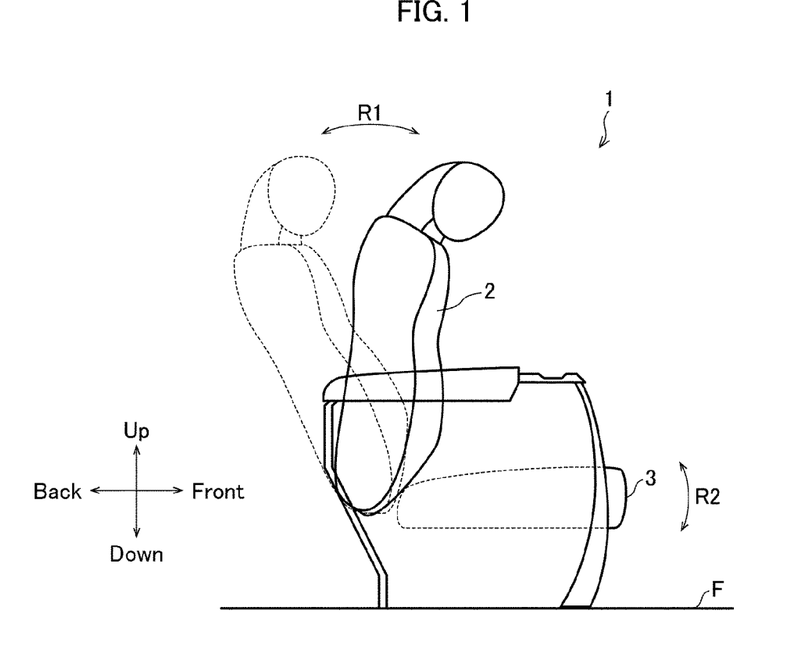
FIG. 1 is a side view illustrating an appearance of a seat in accordance with an embodiment of the present disclosure.

FIG. 1 is a diagram illustrating an example of a seat 1 in accordance with an embodiment of the present disclosure. The seat 1 includes a seatback 2 and a seat bottom 3. The seatback 2 is a seatback of the seat 1, and is provided swingably along a direction R1. The seat bottom 3 is a seat bottom of the seat 1. The seat bottom 3 is provided swingably along a direction R2. Hereinafter, an up-down direction and a front-back direction of the seat 1 are defined as indicated by arrows in FIG. 1.

Hereinafter, the seat 1 is described as a seat that is placed on a floor surface F of a vehicle such as an automobile. Note, however, that the seat 1 is not limited to this example. For example, the seat 1 may be a seat, a massage chair, a nursing bed, or the like, which is placed in a moving body such as an airplane, a train, or a ship.

Figure 2:
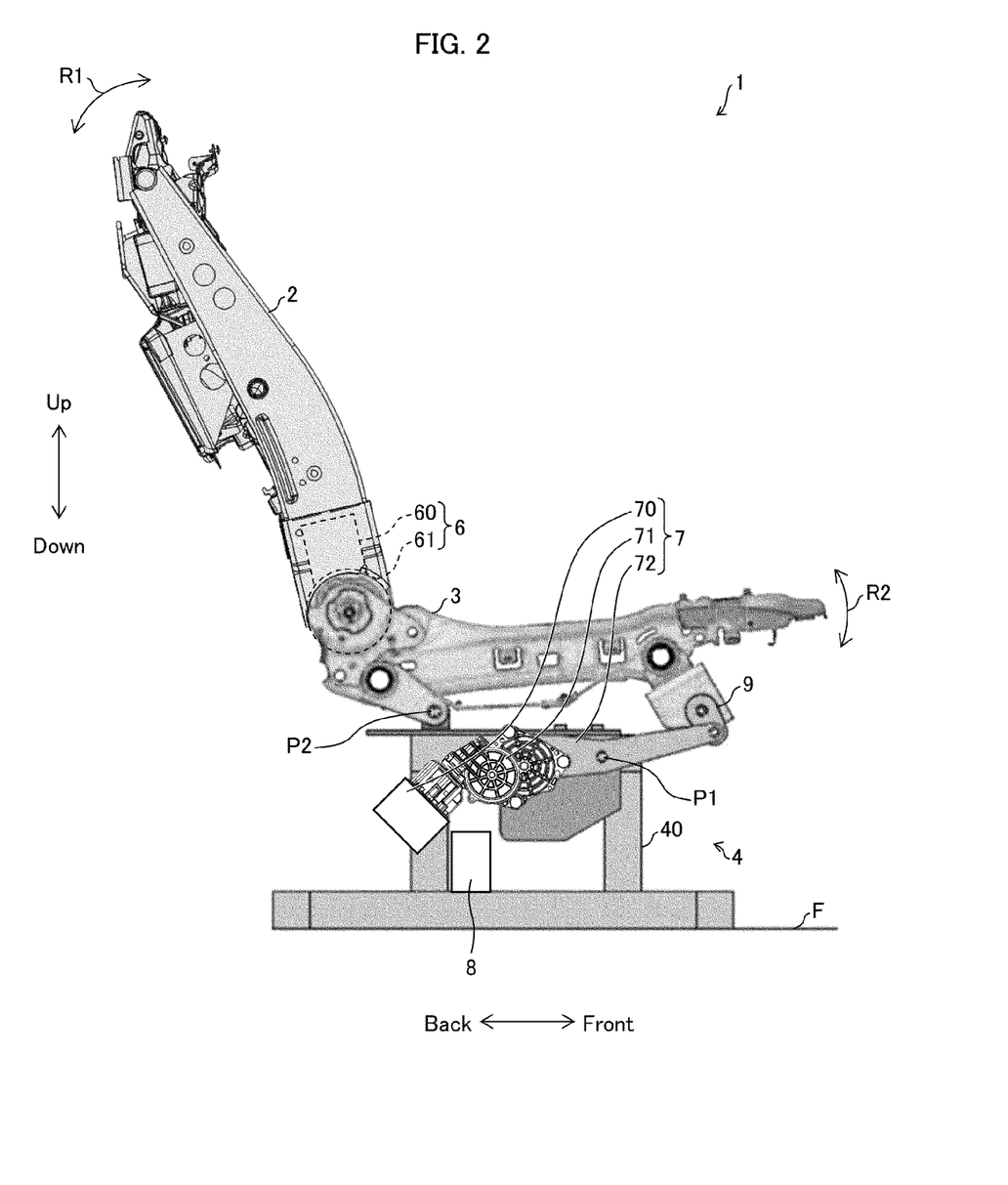
FIG. 2 is a side view illustrating an example of a frame of a seat in accordance with an embodiment of the present disclosure.
Figure 3:
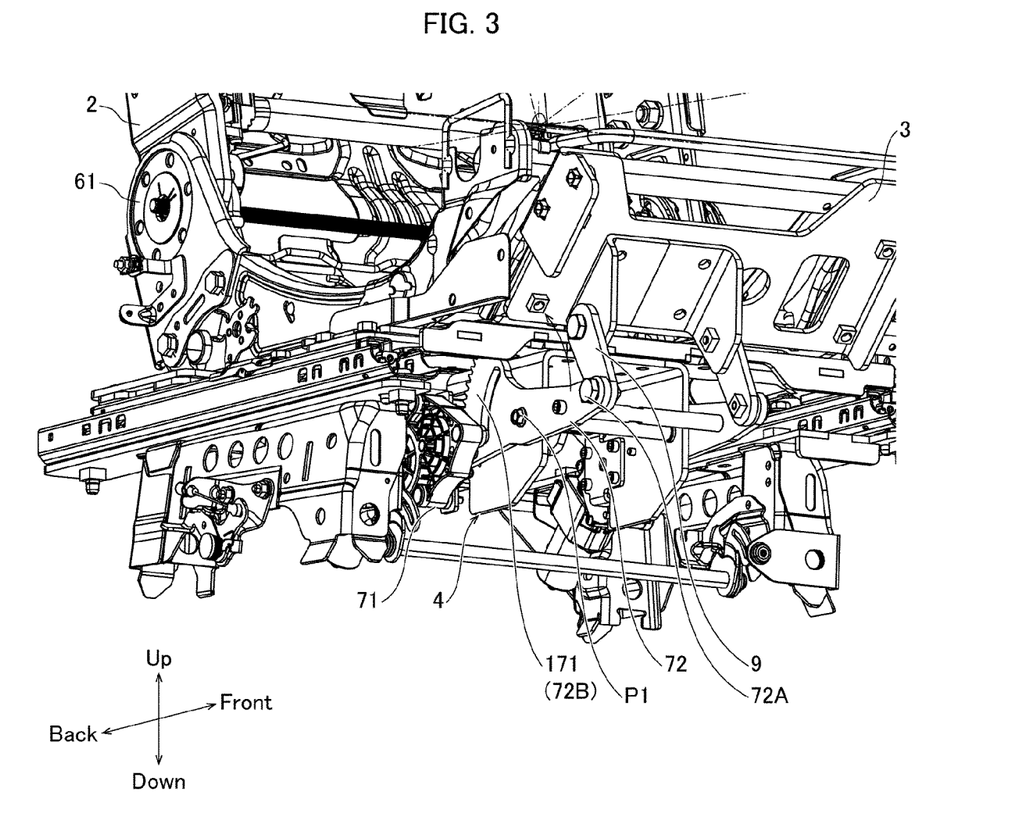
FIG. 3 is a perspective view in which a frame of a seat in accordance with an embodiment of the present disclosure is seen from front and below.

The following description will discuss the seat 1 in more detail with reference to FIGS. 2 and 3. FIG. 2 is a side view illustrating an example of a frame of the seat 1. In FIG. 2, an armrest, a headrest, a cushion, wiring, and the like are not illustrated. The seat 1 further includes a base section 4, a first adjustment section 6, a second adjustment section 7, and a control section 8. The base section 4 is a base having a plurality of leg portions 40, is placed on the floor surface F, and supports the components of the seat 1.

Hereinafter, a position and an angle of each of the seatback 2 and the seat bottom 3 with respect to the base section 4, an angle of the seatback 2 with respect to the seat bottom 3, and the like are referred to as a posture of the seat 1.

The first adjustment section 6 is a reclining mechanism and includes a first driving section 60 and a recliner section 61. The first adjustment section 6 is used to adjust an angle of the seatback 2 with respect to the seat bottom 3. The first driving section 60 is constituted by a motor, and a motor shaft rotates in a positive direction or in a negative direction. The first driving section 60 may further include a gear or the like that transmits rotation of the motor shaft to the recliner section 61. The recliner section 61 causes the seatback 2 to swing along the direction R1 in accordance with a driving direction of the first driving section 60, for example, a rotation direction of the motor shaft. Details of the recliner section 61 will be described later with reference to FIG. 4.

The second adjustment section 7 includes a second driving section 70, a reduction gear 71, and a link 72. The second adjustment section 7 is used to adjust an angle of the seat bottom 3 with respect to the base section 4 or the floor surface F. The second driving section 70 and the reduction gear 71 are supported by the base section 4. The second driving section 70 is constituted by a motor, and a motor shaft rotates in a positive direction or in a negative direction. The reduction gear 71 includes one or more gears and transmits rotation of the motor shaft of the second driving section 70 to the link 72. The link 72 swings around a fulcrum P2 in a direction corresponding to a driving direction of the second driving section 70. For example, when the motor shaft of the second driving section 70 rotates in the positive direction, the seat bottom 3 swings upward in the direction R2 around the fulcrum P2, and when the motor shaft of the second driving section 70 rotates in the negative direction, the seat bottom 3 swings downward in the direction R2 around the fulcrum P2. Note that a relation between the rotation direction of the motor shaft of the second driving section 70 and the swing direction of the seat bottom 3 is not limited to this relation. The second driving section 70 may further include a gear or the like that transmits rotation of the motor shaft to the reduction gear 71.

The control section 8 is, for example, an electronic control unit (ECU), and controls the first driving section 60 and the second driving section 70. In FIG. 2, the control section 8 is fixed to the base section 4. Note, however, that a placement position of the control section 8 is not limited to this. The control section 8 may be constituted by a plurality of control devices that can be synchronized.

The following description will discuss the link 72 in detail with reference to FIG. 3. FIG. 3 is a perspective view in which a frame of the seat 1 is seen from front and below. As illustrated in FIG. 3, a first end 72A of the link 72 is connected to the seat bottom 3 via a bracket 9, and a second end 72B opposite to the first end 72A is provided with a sector gear 171. The sector gear 171 is engaged with a gear that constitutes the reduction gear 71. The link 72 swings around a fulcrum P1 (which serves as a rotation axis) in accordance with the driving direction of the second driving section 70, for example, the rotation direction of the motor shaft. When an engagement position between the sector gear 171 and the reduction gear 71 moves upward, the first end 72A of the link 72 swings upward around the fulcrum P1 which serves as the rotation axis. When the engagement position between the sector gear 171 and the reduction gear 71 moves downward, the first end 72A of the link 72 swings downward around the fulcrum P1 which serves as the rotation axis. By these swings, the seat bottom 3 connected to the bracket 9 swings around the fulcrum P2 which is not illustrated in FIG. 3.

[Configuration of Recliner Section 61]

Figure 4A:
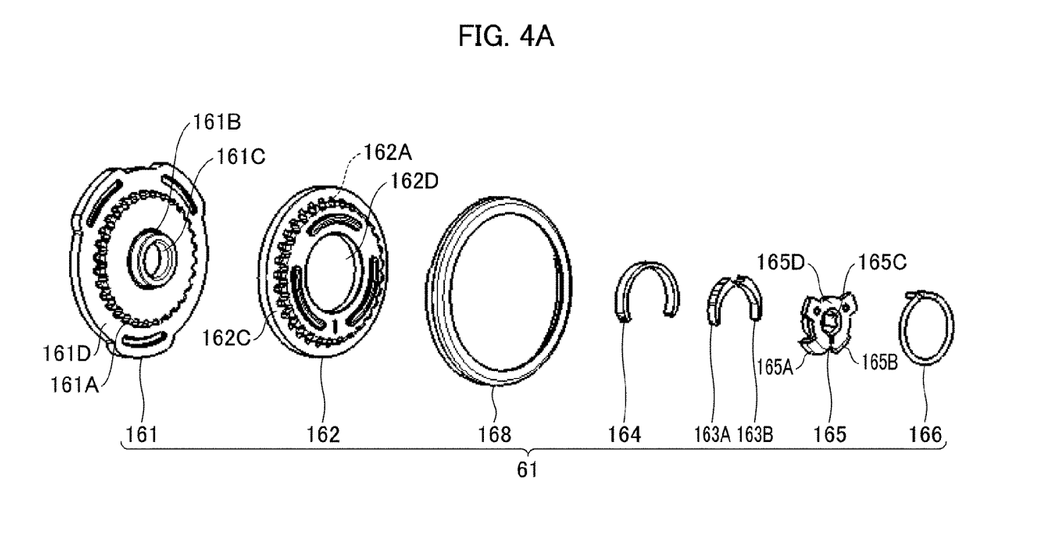
FIG. 4A is an exploded view illustrating an example of a recliner section illustrated in FIG. 2.
Figure 4B:
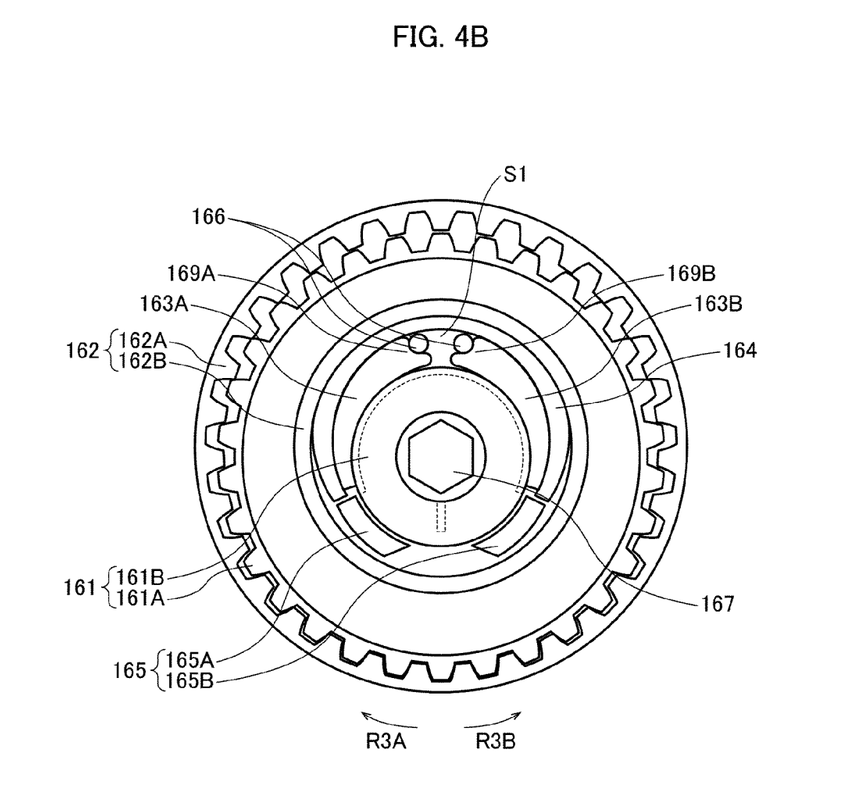
FIG. 4B is a cross-sectional view illustrating an example of the recliner section illustrated in FIG. 2.

The following description will discuss details of the recliner section 61 with reference to FIG. 4. FIG. 4A is an exploded view illustrating an example of the recliner section 61. FIG. 4B is a cross-sectional view illustrating an example of the recliner section 61. As illustrated in FIG. 4A and FIG. 4B, the recliner section 61 includes an upper gear 161, a lower gear 162, a pair of small wedges 163A and 163B, a large wedge 164, a striker 165, a spring 166, a shaft 167, and an outer circumferential ring 168.

The upper gear 161 is an example of the first gear, and is connected to the seatback 2 which is not illustrated in FIG. 4. The upper gear 161 includes external teeth 161A, a first bearing portion 161B, and a brim portion 161D. The first bearing portion 161B has an opening 161C therein. The external teeth 161A of the upper gear 161 protrude from the brim portion 161D. The first bearing portion 161B further protrudes from the external teeth 161A.

The lower gear 162 is an example of the second gear, and is connected to the seat bottom 3 which is not illustrated in FIG. 4. The lower gear 162 includes internal teeth 162A, a second bearing portion 162B, and a brim portion 162C. The brim portion 162C has a recessed part, and the internal teeth 162A are provided on a side wall of the recessed part. At a center of the recessed part, the second bearing portion 162B including an opening 162D is provided.

The upper gear 161 is pivotally enclosed in the outer circumferential ring 168. The outer circumferential ring 168 is crimped onto the lower gear 162. The upper gear 161 after crimping is in a state in which the external teeth 161A thereof are inserted into the recessed part of the brim portion 162C of the lower gear 162.

As illustrated in FIG. 4B, the external teeth 161A of the upper gear 161 face the internal teeth 162A of the lower gear 162, and the first bearing portion 161B of the upper gear 161 faces the second bearing portion 162B of the lower gear 162. In the upper gear 161 and the lower gear 162 after crimping, the first bearing portion 161B, the second bearing portion 162B, the external teeth 161A, and the internal teeth 162A are disposed in this order from the inside to the outside in the radial direction of the shaft 167. The angle of the seatback 2 with respect to the seat bottom 3 is determined by an engagement position between the external teeth 161A of the upper gear 161 and the internal teeth 162A of the lower gear 162.

The pair of small wedges 163A and 163B, the large wedge 164, and a pair of protrusions 165A and 165B of the striker 165 are disposed between an outer circumference of the first bearing portion 161B and an inner circumference of the second bearing portion 162B. The pair of small wedges 163A and 163B is an example of the first and second wedge members.

An end portion 169A of the small wedge 163A and an end portion 169B of the small wedge 163B are disposed so as to face each other, and a gap S1 is provided between the end portion 169A and the end portion 169B. The pair of small wedges 163A and 163B decreases in radial thickness in directions from the end portions 169A and 169B to the respective other ends. The large wedge 164 is disposed such that the pair of small wedges 163A and 163B is sandwiched between the large wedge 164 and the first bearing portion 161B.

The spring 166 is locked by the end portion 169A of the small wedge 163A and the end portion 169B of the small wedge 163B. The spring 166 applies pushing force to the small wedges 163A and 163B in a direction of widening the gap S1 between the end portion 169A and the end portion 169B. The small wedges 163A and 163B to which pushing force is applied by the spring 166 abut on the outer circumference of the first bearing portion 161B and the large wedge 164. The large wedge 164 abuts on the inner circumference of the second bearing portion 162B and the pair of small wedges 163A and 163B. The upper gear 161 and the lower gear 162 are restricted in rotation due to frictional engagement between the first bearing portion 161B, the second bearing portion 162B, the small wedges 163A and 163B, and the large wedge 164 based on pushing force of the spring 166.

The striker 165 includes the pair of protrusions 165A and 165B, and a brim portion 165D. The brim portion 165D has an opening 165C therein. The pair of protrusions 165A and 165B are inserted between the outer circumference of the first bearing portion 161B and the inner circumference of the second bearing portion 162B. The protrusion 165A is disposed at a position closer to the small wedge 163A than the protrusion 165B is. The shaft 167 is inserted into the opening 165C of the striker 165. The shaft 167 rotates in a direction along a circumferential direction R3 in accordance with the driving direction of the first driving section 60 illustrated in FIG. 2. The striker 165 moves along the circumferential direction R3 in accordance with rotation of the shaft 167. Hereinafter, it is assumed that, when the motor shaft of the first driving section 60 rotates in the positive direction, the striker 165 moves in a circumferential direction R3B, and when the motor shaft of the first driving section 60 rotates in the negative direction, the striker 165 moves in a circumferential direction R3A.

(Control Example of First Adjustment Section 6 and Second Adjustment Section 7 by Control Section 8)

Figure 5:
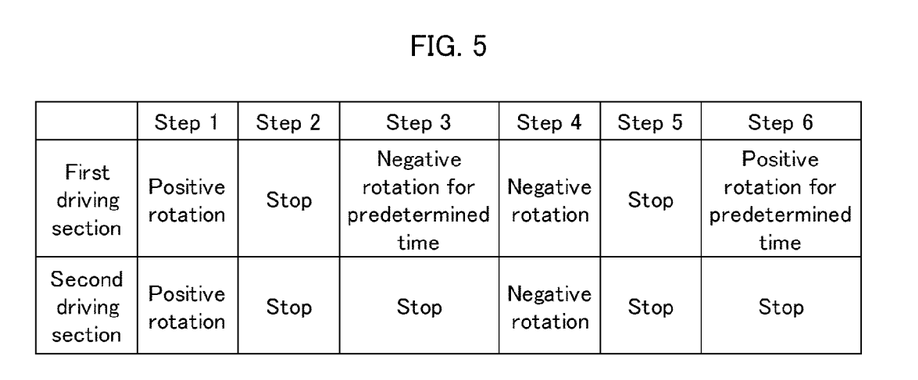
FIG. 5 is a diagram illustrating an example of controlling a seat in accordance with an embodiment of the present disclosure.

FIG. 5 illustrates a control example in which the first driving section 60 and the second driving section 70 are controlled by the control section 8 illustrated in FIG. 2. In the control example illustrated in FIG. 5, the seat 1 is reciprocated between a posture illustrated in FIG. 6A and a posture illustrated in FIG. 6B. In the posture illustrated in FIG. 6B, the seatback 2 swings backward along the direction R1 and a front portion of the seat bottom 3 swings upward along the direction R2, as compared with the posture illustrated in FIG. 6A. By reciprocating the seat 1 in this manner, an effect of relaxing a user seated on the seat 1, an effect of stimulating an otolith involved in a sense of equilibrium of the user to induce sleepiness, and the like are attempted.

Figure 6A:
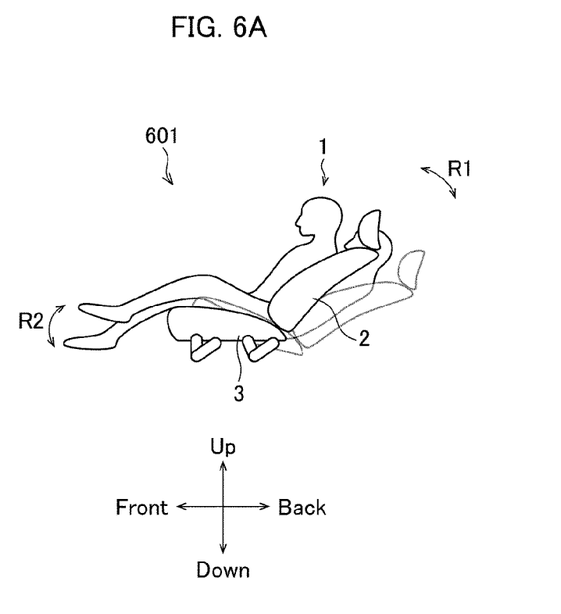
FIG. 6A is a diagram illustrating an example of oscillation of a seat in accordance with an embodiment of the present disclosure.
Figure 7A:
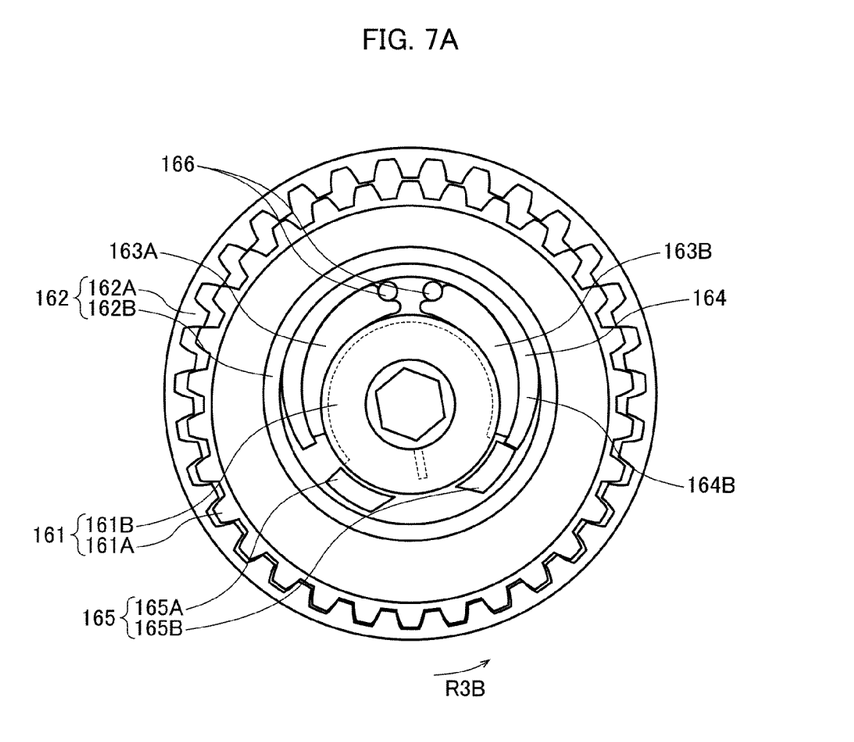
FIG. 7A is a diagram used to describe a preparation operation of the recliner section illustrated in FIG. 4.

As an initial state of the control exemplified in FIG. 5, it is assumed that the seat 1 is in the posture illustrated in FIG. 6A and the recliner section 61 is in a state illustrated in FIG. 7A. The state illustrated in FIG. 7A is an example of the first state in which the protrusion 165B of the striker 165 is disposed near the small wedge 163B, and the protrusion 165B abuts on the end portion 164B of the large wedge 164.

The control section 8 repeats the control from STEP 1 to STEP 6 exemplified in FIG. 5. In STEP 1, the control section 8 causes the motor shaft of the first driving section 60 illustrated in FIG. 2 to rotate in the positive direction, and thus the striker 165 illustrated in FIG. 7 moves along the circumferential direction R3B against the pushing force of the spring 166. Moreover, the control section 8 causes the motor shaft of the second driving section 70 illustrated in FIG. 2 to rotate in the positive direction, and thus the sector gear 171 of the link 72 (FIG. 3) swings downward and the seat bottom 3 swings upward along the direction R2.

Figure 8A:
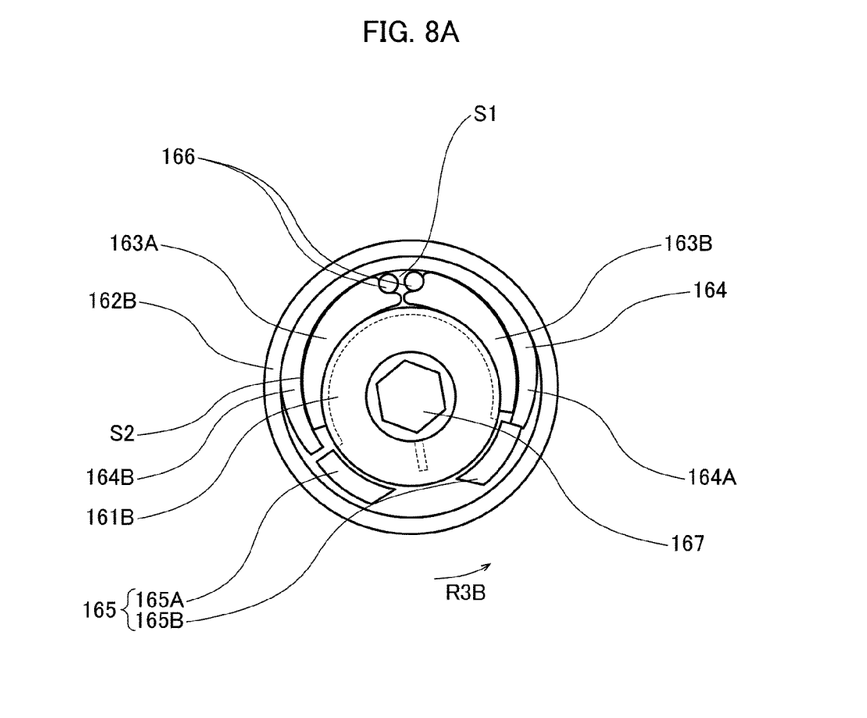
FIG. 8A is a diagram illustrating an operation example of the recliner section illustrated in FIG. 4.

FIG. 8A illustrates a state in which the striker 165 has moved along the circumferential direction R3B against the pushing force of the spring 166 from the state illustrated in FIG. 7A. In FIG. 8, the external teeth 161A and the internal teeth 162A are not illustrated.

By the movement of the striker 165 along the circumferential direction R3B, the large wedge 164 which is pushed by the protrusion 165B of the striker 165 moves along the circumferential direction R3B. Further, the small wedge 163B is pushed toward the inner circumferential side of the end portion 164B of the large wedge 164 and moves along the circumferential direction R3B against the pushing force of the spring 166. Thus, the gap S1 is narrowed.

Meanwhile, around the end portion 164A of the large wedge 164, a gap S2 is generated by the movement of the large wedge 164 between the large wedge 164 and the small wedge 163A. The generation of the gap S2 releases the frictional engagement between the first bearing portion 161B, the second bearing portion 162B, the pair of small wedges 163A and 163B, and the large wedge 164. Thus, the upper gear 161 can rotate with respect to the lower gear 162.

Figure 8B:
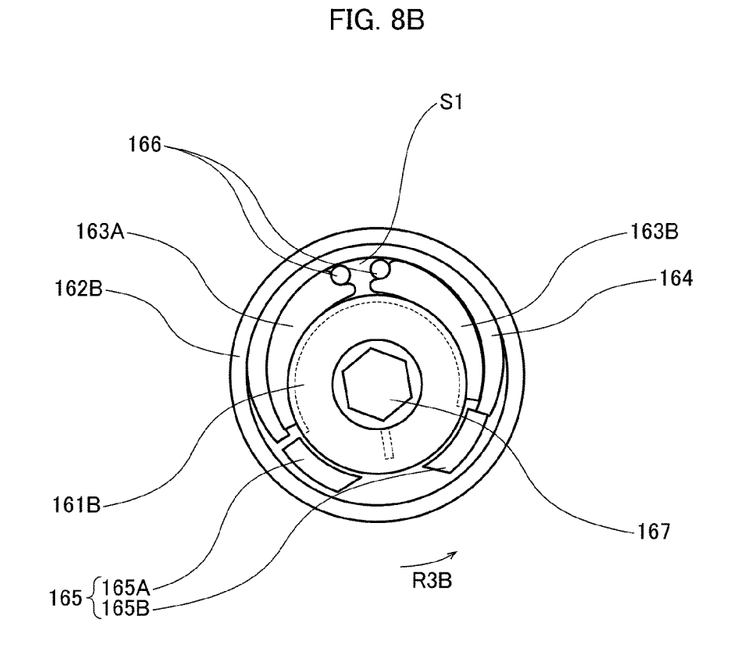
FIG. 8B is a diagram illustrating an operation example of the recliner section illustrated in FIG. 4.

As illustrated in FIG. 8B, due to pushing force of the spring 166, the small wedge 163A moves along the circumferential direction R3B toward the gap S2, and the gap S1 is widened. At this time, the upper gear 161 rotates with respect to the lower gear 162, an engagement position between the external teeth 161A and the internal teeth 162A moves, and an angle of the seatback 2 with respect to the seat bottom 3 is adjusted.

The control section 8 causes the large wedge 164 to move along the circumferential direction R3B by the protrusion 165B of the striker 165 until the angle of the seatback 2 with respect to the seat bottom 3 reaches an intended angle. When the seat 1 reaches the posture illustrated in FIG. 6B, the control section 8 proceeds to control in STEP 2 in FIG. 5.

In STEP 2 of FIG. 5, the control section 8 of FIG. 2 stops the first driving section 60 and the second driving section 70. In oscillation of the seat 1, the seatback 2 and the seat bottom 3 are temporarily stopped before the driving directions of the seatback 2 and the seat bottom 3 are reversed, and this makes it possible to alleviate impact due to a change in acceleration. Further, it is possible to inhibit the motors respectively constituting the first driving section 60 and the second driving section 70 from being heated.

Figure 7B:
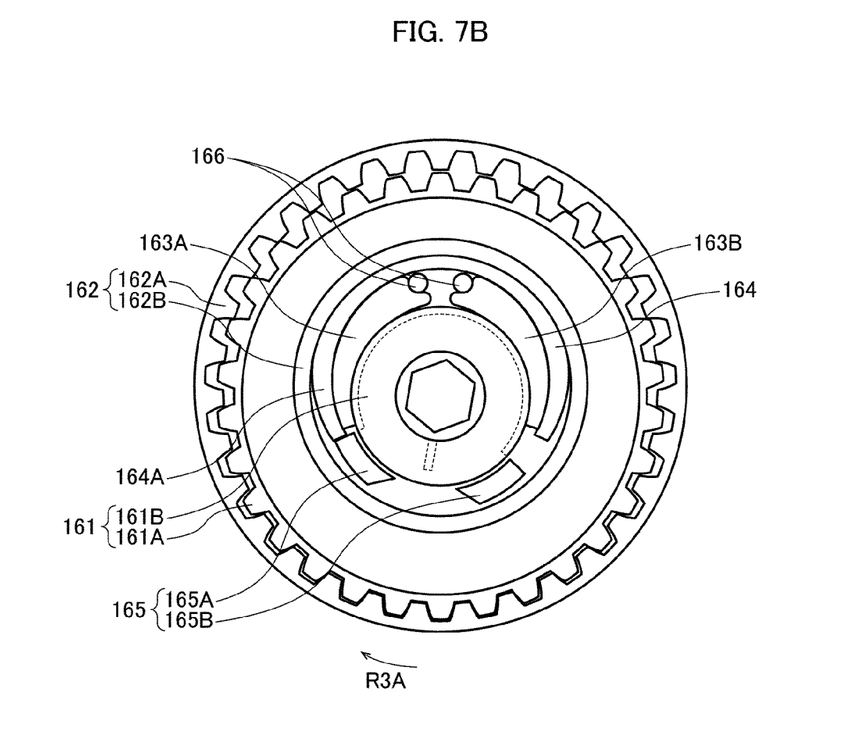
FIG. 7B is a diagram used to describe a preparation operation of the recliner section illustrated in FIG. 4.

In STEP 2 of FIG. 5, while the first driving section 60 and the second driving section 70 in FIG. 2 are stopped, the protrusion 165B of the striker 165 is located near the small wedge 163B and abuts on the end portion 164B of the large wedge 164 as illustrated in FIG. 7A. In order to return the seat 1 to the posture illustrated in FIG. 6A, it is necessary to reverse the direction in which the angle is adjusted by the first adjustment section 6. In order to reverse the direction in which the angle is adjusted by the first adjustment section 6, the control section 8 causes the striker 165 to move in the circumferential direction R3A illustrated in FIG. 7B. The state illustrated in FIG. 7B is an example of the second state in which the protrusion 165A of the striker 165 is disposed near the small wedge 163A, and the protrusion 165A abuts on the end portion 164A of the large wedge 164.

In STEP 1 of FIG. 5, the striker 165 illustrated in FIG. 8 moves along the circumferential direction R3B, and thus the angle of the seatback 2 with respect to the seat bottom 3 is adjusted. Meanwhile, while the striker 165 is moving from the first state illustrated in FIG. 7A to the second state illustrated in FIG. 7B, the striker 165 idles, and the angle of the seatback 2 with respect to the seat bottom 3 in FIG. 2 does not change. Hereinafter, the operation of moving the striker 165 from the first state to the second state or from the second state to the first state is referred to as a preparation operation.

In a case where the driving directions of the first driving section 60 and the second driving section 70 in FIG. 2 are reversed at the same time, a timing at which the first adjustment section 6 starts adjustment is delayed, by a necessary time T for the preparation operation, from a timing at which the second adjustment section 7 starts adjustment. The necessary time T for the preparation operation is, for example, a time necessary to rotate the motor shaft of the first driving section 60 by approximately 9 revolutions, and is approximately 0.7 seconds. The difference between the timings may give an uncomfortable feeling to a user who is reciprocating the seat 1.

In STEP 3 of FIG. 5, the control section 8 leaves the second driving section 70 in FIG. 2 in a stopped state and causes the first driving section 60 to rotate in advance in the negative direction for the necessary time T for the preparation operation. Thus, it is possible to complete the preparation operation within a period in which the second driving section 70 is stopped. A timing at which the preparation operation is carried out can be any time during a stop period of STEP 3 in which the second driving section 70 is stopped. The preparation operation may be started prior to an estimated finish timing of the stop period by the necessary time T. Alternatively, a period for stopping the first driving section 60 again after the preparation operation may be provided to prevent the motor of the first driving section 60 from becoming overheated.

In STEP 4 of FIG. 5, the control section 8 causes the first driving section 60 and the second driving section 70 in FIG. 2 to rotate in the negative direction. In STEP 3, the preparation operation of the first adjustment section 6 is completed in advance. Therefore, it is possible to match a timing at which the first adjustment section 6 starts adjustment with a timing at which the second adjustment section 7 starts adjustment.

In STEP 4 of FIG. 5, a reverse operation of STEP 1 is carried out. That is, the control section 8 in FIG. 2 causes the first driving section 60 to rotate in the negative direction, and thus the striker 165 in FIG. 7B moves along the circumferential direction R3A against pushing force of the spring 166. The small wedge 163A is pushed toward the inner circumferential side of the end portion 164A of the large wedge 164, and moves along the circumferential direction R3A together with the large wedge 164. Thus, the gap S1 is narrowed. Further, the protrusion 165A of the striker 165 causes the large wedge 164 to move along the circumferential direction R3A, and thus a gap is generated between the large wedge 164 and the small wedge 163B near the end portion 164B. By the pushing force of the spring 166, the small wedge 163B moves along the circumferential direction R3A, and the gap S1 is widened. At this time, the upper gear 161 rotates with respect to the lower gear 162, the engagement position between the external teeth 161A and the internal teeth 162A moves, and the angle of the seatback 2 with respect to the seat bottom 3 is adjusted.

In STEP 5, similarly to STEP 2, the control section 8 in FIG. 2 stops the first driving section 60 and the second driving section 70.

In STEP 6, the control section 8 in FIG. 2 leaves the second driving section 70 in a stopped state and causes the first driving section 60 to rotate in advance in the positive direction for the necessary time T for the preparation operation. By the preparation operation, the striker 165 moves from the second state to the first state.

Subsequently, the control section 8 in FIG. 2 repeats the processes from STEP 1 to STEP 6. In STEP 6, the preparation operation of the first adjustment section 6 is completed in advance. Therefore, in the subsequent STEP 1, it is possible to match a timing at which the first adjustment section 6 starts adjustment with a timing at which the second adjustment section 7 starts adjustment.

[Effects]

As described above, in STEP 2 and STEP 3, the control section 8 of the seat 1 stops adjustment by the second adjustment section 7 when the control section 8 reverses, in STEP 4 of FIG. 5, the direction in which the first adjustment section 6 adjusts the angle of the seatback 2 with respect to the seat bottom 3 and the direction in which the second adjustment section 7 adjusts the angle of the seat bottom 3 with respect to the base section 4. Moreover, the control section 8 completes the preparation operation of the first adjustment section 6 during the stop period of STEP 3. Therefore, it is possible to eliminate an operation delay of the first adjustment section 6 that may occur when the adjustment directions of the first adjustment section 6 and the second adjustment section 7 are reversed.

[Variation]

In the above embodiment, the second adjustment section 7 adjusts the angle of the seat bottom 3 with respect to the base section 4. However, the present disclosure is not limited to the foregoing embodiment only. For example, the posture of the seat 1 may be adjusted by moving the seatback 2 and the seat bottom 3 up, down, forward, or backward, in accordance with the driving direction of the motor of the second driving section 70 or the like. It is possible that a mechanism for massage provided in the seatback 2 or the like is adjusted.

In the above embodiment, it is assumed that the protrusion 165B of the striker 165 in FIG. 7 abuts on the end portion 164B of the large wedge 164 in the first state as illustrated in FIG. 7A, and the protrusion 165A of the striker 165 abuts on the end portion 164A of the large wedge 164 in the second state as illustrated in FIG. 7B. However, the definitions of the first state and the second state are not limited to this. For example, in the first state, the protrusion 165B of the striker 165 and the end portion 164B of the large wedge 164 do not need to be in contact with each other, provided that the protrusion 165B is close to the end portion 164B. In the second state, the protrusion 165A of the striker 165 and the end portion 164A of the large wedge 164 do not need to be in contact with each other, provided that the protrusion 165A is close to the end portion 164A.

The configuration of the recliner section 61 is not limited to that described above. For example, the large wedge 164 does not need to be provided. In this case, it is possible that the radial thicknesses of the pair of small wedges 163A and 163B are increased, and the pair of small wedges 163A and 163B is caused to abut on both the outer circumference of the first bearing portion 161B and the inner circumference of the second bearing portion 162B. The striker 165 may be arranged such that the protrusion 165A or 165B directly abuts on the pair of small wedges 163A and 163B without via the large wedge 164. In this case, the first state of the striker 165 may be a state in which the protrusion 165B of the striker 165 abuts on the small wedge 163B, and the second state may be a state in which the protrusion 165A of the striker 165 abuts on the small wedge 163A.

The protrusions 165A and 165B of the striker 165 may be integrally provided. In this case, the first state may be a state in which the protrusion of the striker 165 is disposed near the small wedge 163B, and the protrusion abuts on the end portion 164B of the large wedge 164. Moreover, the second state may be a state in which the protrusion of the striker 165 is disposed near the small wedge 163A, and the protrusion abuts on the end portion 164A of the large wedge 164.

In the above described embodiment and the variation, the preparation operation of the first adjustment section 6 is an operation to move the striker 165 from the first state to the second state or from the second state to the first state. However, the present disclosure is not limited to this. As long as a delay is provided after the driving direction of the first driving section 60 is reversed and until the adjustment direction by the first adjustment section 6 is actually reversed, an operation other than the movement of the striker 165 may be included in the preparation operation. For example, it is possible to include a delay in activation of an actuator or the like employed in the first driving section 60.

In the above embodiment, in STEP 1 and STEP 4 of FIG. 5, it is assumed that the first driving section 60 and the second driving section 70 are rotated in the positive or negative direction. However, timings at which the driving is started do not need to be strictly simultaneous. The timings may be different to an extent that does not give an uncomfortable feeling to a user who is seated on the seat 1.

Figure 6B:
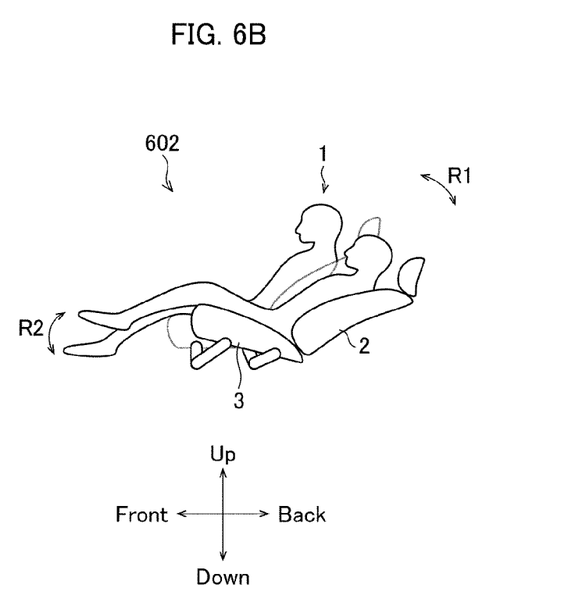
FIG. 6B is a diagram illustrating an example of oscillation of a seat in accordance with an embodiment of the present disclosure.

In the above embodiment, as an example of controlling the first driving section 60 and the second driving section 70 by the control section 8, control has been described in which a reciprocating operation is carried out between the posture illustrated in FIG. 6A and the posture illustrated in FIG. 6B. However, the application scope of the control method of the present disclosure is not limited to this. The control method of the present disclosure can be applied to any control in which the driving directions of the first driving section 60 and the second driving section 70 need to be reversed substantially simultaneously.

[Software Implementation Example]

The functions of the seat 1 (hereinafter, referred to as "device") can be realized by a program for causing a computer to function as the device, the program causing the computer to function as the control blocks of the device (in particular, the components included in the control section 8).

In this case, the device includes a computer that has at least one control device (e.g., a processor) and at least one storage device (e.g., a memory) as hardware for executing the program. By executing the program with the control device and the storage device, the functions described in the above embodiments are realized.

The program can be stored in one or more non-transitory computer-readable storage mediums. The storage medium can be provided in the device, or the storage medium does not need to be provided in the device. In the latter case, the program can be supplied to the device via an arbitrary wired or wireless transmission medium.

One or some or all of the functions of the control blocks can be realized by a logic circuit. For example, an integrated circuit in which a logic circuit that functions as the control blocks is formed is also encompassed in the scope of the present disclosure. Other than those, for example, it is possible to realize the functions of the control blocks by a quantum computer.

The present disclosure is not limited to the foregoing embodiments, but may be altered in various ways by a skilled person within the scope of the claims. Any embodiment based on a proper combination of technical means disclosed in different embodiments is also encompassed in the technical scope of the present disclosure.

Aspects of the present disclosure can also be expressed as follows:

The seat in accordance with an aspect 1 of the present disclosure includes: a seat bottom; a seatback; a first adjustment section that includes a first driving section and that adjusts an angle of the seatback with respect to the seat bottom in a direction corresponding to a driving direction of the first driving section; a second adjustment section that includes a second driving section and that adjusts a posture of the seat in a direction corresponding to a driving direction of the second driving section; and a control section that controls the first driving section and the second driving section, a preparation operation being carried out for the first adjustment section during a period from when the driving direction of the first driving section is reversed to when the direction in which the angle is adjusted is reversed, and when reversing the direction in which the angle is adjusted by the first adjustment section and reversing the direction in which the posture is adjusted by the second adjustment section, the control section providing a stop period before a timing at which the driving direction of the second driving section is reversed, the stop period being a period for stopping the second adjustment section from adjusting the posture, and the control section causing the first adjustment section to carry out the preparation operation in advance during the stop period.

According to the configuration, the preparation operation of the first adjustment section, which is a reclining mechanism, is carried out in advance during a period in which the second adjustment section, which is a mechanism other than the reclining mechanism, is stopped. Therefore, it is possible to reverse the adjustment direction of the reclining mechanism without an operation delay at a timing at which the adjustment direction of the mechanism other than the reclining mechanism is reversed.

In the seat in accordance with an aspect 2 of the present disclosure: the first adjustment section starts the preparation operation prior to an estimated finish timing of the stop period by a necessary time for the preparation operation, and completes the preparation operation at the estimated finish timing.

According to the configuration, the preparation operation of the first adjustment section is completed at the estimated finish timing of the stop period of the second adjustment section. Therefore, it is possible to smoothly start the operation of the first adjustment section in which the adjustment direction has been reversed.

In the seat in accordance with an aspect 3 of the present disclosure, the first adjustment section includes: a shaft that rotates in the direction in which the angle is adjusted; a first gear in which a first bearing portion and external teeth are disposed in this order outward in a radial direction of the shaft; a second gear in which a second bearing portion and internal teeth are disposed in this order outward in the radial direction of the shaft, the first gear and the second gear being combined such that the internal teeth face the external teeth of the first gear and the second bearing portion faces the first bearing portion of the first gear; a first wedge member and a second wedge member which are disposed between the first bearing portion and the second bearing portion and cause the external teeth of the first gear to engage with the internal teeth of the second gear; and a striker which has a protrusion inserted between the first bearing portion and the second bearing portion and rotates in accordance with rotation of the shaft, the striker being movable between a first state and a second state when the protrusion moves in a circumferential direction of the shaft in accordance with rotation of the shaft, in the first state, the protrusion being disposed near the first wedge member, and in the second state, the protrusion being disposed near the second wedge member, and the preparation operation being an operation to cause the protrusion to move from the first state to the second state or from the second state to the first state.

In the seat in accordance with an aspect 4 of the present disclosure: the second adjustment section includes a first end, a second end, and a link, the first end being connected to the seat bottom, the second end being opposite to the first end, and the link having a rotation axis between the first end and the second end; the second adjustment section causes the second end of the link to swing in a direction corresponding to the driving direction of the second driving section so that the first end of the link swings; and the second adjustment section adjusts, by the swing of the first end, an angle of the seat bottom with respect to a placement surface on which the seat is placed.

The control method in accordance with an aspect 5 of the present disclosure is a method for controlling a seat including: a seat bottom; a seatback; a first adjustment section that includes a first driving section and that adjusts an angle of the seatback with respect to the seat bottom in a direction corresponding to a driving direction of the first driving section; a second adjustment section that includes a second driving section and that adjusts a posture of the seat in a direction corresponding to a driving direction of the second driving section; and a control section that controls the first adjustment section and the second adjustment section, a preparation operation being carried out for the first adjustment section during a period from when the driving direction of the first driving section is reversed to when the direction in which the angle is adjusted is reversed, when reversing the direction in which the angle is adjusted by the first adjustment section and reversing the direction in which the posture is adjusted by the second adjustment section, a stop period being provided before a timing at which the driving direction of the second driving section is reversed, the stop period being a period for stopping the second adjustment section from adjusting the posture, and the control section causing the first adjustment section to carry out the preparation operation in advance during the stop period.

According to the configuration, the preparation operation of the first adjustment section, which is a reclining mechanism, is carried out in advance during a period in which the second adjustment section, which is a mechanism other than the reclining mechanism, is stopped. Therefore, it is possible to reverse the adjustment direction of the reclining mechanism without an operation delay at a timing at which the adjustment direction of the mechanism other than the reclining mechanism is reversed.

REFERENCE SIGNS LIST

1: Seat
2: Seatback
3: Seat bottom
4: Base section
6: First adjustment section
7: Second adjustment section
8: Control section
40: Leg portion
60: First driving section
61: Recliner section
70: Second driving section
71: Reduction gear
72: Link
161: Upper gear
161A: External teeth
161B: First bearing portion
162: Lower gear
162A: Internal teeth
162B: Second bearing portion
163A, 163B: Small wedge
164: Large wedge
165: Striker
165A, 165B: Protrusion
166: Spring
167: Shaft
171: Sector gear

The invention claimed is:

1. A seat, comprising:
a seat bottom;
a seatback;
a first adjustment section that includes a first driving section and that adjusts an angle of the seatback with respect to the seat bottom in a direction corresponding to a driving direction of the first driving section;
a second adjustment section that includes a second driving section and that adjusts a posture of said seat in a direction corresponding to a driving direction of the second driving section; and
a control section that controls the first driving section and the second driving section,
a preparation operation being carried out for the first adjustment section during a period from when the driving direction of the first driving section is reversed to when the direction in which the angle is adjusted is reversed, and
when reversing the direction in which the angle is adjusted by the first adjustment section and reversing the direction in which the posture is adjusted by the second adjustment section,
the control section providing a stop period before a timing at which the driving direction of the second driving section is reversed, the stop period being a period for stopping the second adjustment section from adjusting the posture, and
the control section causing the first adjustment section to carry out the preparation operation in advance during the stop period.

2. The seat as set forth in claim 1, wherein:
the first adjustment section starts the preparation operation prior to an estimated finish timing of the stop period by a necessary time for the preparation operation, and completes the preparation operation at the estimated finish timing.

3. The seat as set forth in claim 2, wherein:
the second adjustment section includes a first end, a second end, and a link, the first end being connected to the seat bottom, the second end being opposite to the first end, and the link having a rotation axis between the first end and the second end;
the second adjustment section causes the second end of the link to swing in a direction corresponding to the driving direction of the second driving section so that the first end of the link swings; and
the second adjustment section adjusts, by the swing of the first end, an angle of the seat bottom with respect to a placement surface on which said seat is placed.

4. The seat as set forth in claim 2, wherein the first adjustment section includes:
a shaft that rotates in the direction in which the angle is adjusted;
a first gear in which a first bearing portion and external teeth are disposed in this order outward in a radial direction of the shaft;
a second gear in which a second bearing portion and internal teeth are disposed in this order outward in the radial direction of the shaft, the first gear and the second gear being combined such that the internal teeth face the external teeth of the first gear and the second bearing portion faces the first bearing portion of the first gear;
a first wedge member and a second wedge member which are disposed between the first bearing portion and the second bearing portion and cause the external teeth of the first gear to engage with the internal teeth of the second gear; and
a striker which has a protrusion inserted between the first bearing portion and the second bearing portion and rotates in accordance with rotation of the shaft,
the striker being movable between a first state and a second state when the protrusion moves in a circumferential direction of the shaft in accordance with rotation of the shaft, in the first state, the protrusion being disposed near the first wedge member, and in the second state, the protrusion being disposed near the second wedge member, and
the preparation operation being an operation to cause the protrusion to move from the first state to the second state or from the second state to the first state.

5. The seat as set forth in claim 1, wherein:
the second adjustment section includes a first end, a second end, and a link, the first end being connected to the seat bottom, the second end being opposite to the first end, and the link having a rotation axis between the first end and the second end;
the second adjustment section causes the second end of the link to swing in a direction corresponding to the driving direction of the second driving section so that the first end of the link swings; and
the second adjustment section adjusts, by the swing of the first end, an angle of the seat bottom with respect to a placement surface on which said seat is placed.

6. The seat as set forth in claim 1, wherein the first adjustment section includes:
a shaft that rotates in the direction in which the angle is adjusted;
a first gear in which a first bearing portion and external teeth are disposed in this order outward in a radial direction of the shaft;
a second gear in which a second bearing portion and internal teeth are disposed in this order outward in the radial direction of the shaft, the first gear and the second gear being combined such that the internal teeth face the external teeth of the first gear and the second bearing portion faces the first bearing portion of the first gear;
a first wedge member and a second wedge member which are disposed between the first bearing portion and the second bearing portion and cause the external teeth of the first gear to engage with the internal teeth of the second gear; and
a striker which has a protrusion inserted between the first bearing portion and the second bearing portion and rotates in accordance with rotation of the shaft,
the striker being movable between a first state and a second state when the protrusion moves in a circumferential direction of the shaft in accordance with rotation of the shaft, in the first state, the protrusion being disposed near the first wedge member, and in the second state, the protrusion being disposed near the second wedge member, and
the preparation operation being an operation to cause the protrusion to move from the first state to the second state or from the second state to the first state.

7. A method for controlling a seat, the seat comprising:
a seat bottom;
a seatback;
a first adjustment section that includes a first driving section and that adjusts an angle of the seatback with respect to the seat bottom in a direction corresponding to a driving direction of the first driving section;
a second adjustment section that includes a second driving section and that adjusts a posture of the seat in a direction corresponding to a driving direction of the second driving section; and
a control section that controls the first adjustment section and the second adjustment section, the method comprising:
carrying out a preparation operation for the first adjustment section during a period from when the driving direction of the first driving section is reversed to when the direction in which the angle is adjusted is reversed, and
when reversing the direction in which the angle is adjusted by the first adjustment section and reversing the direction in which the posture is adjusted by the second adjustment section, providing a stop period before a timing at which the driving direction of the second driving section is reversed, the stop period being a period for stopping the second adjustment section from adjusting the posture,
wherein the control section causes the first adjustment section to carry out the preparation operation in advance during the stop period.

* * * * *